(12) United States Patent
Anerino (10) Patent No.: US 10,271,675 B2
(45) Date of Patent: *Apr. 30, 2019

(54) HEATABLE CANTEEN

(71) Applicant: Daniel J. Anerino, Athens, OH (US)

(72) Inventor: Daniel J. Anerino, Athens, OH (US)

( * ) Notice: Subject to any disclaimer, the term of this patent is extended or adjusted under 35 U.S.C. 154(b) by 128 days.

This patent is subject to a terminal disclaimer.

(21) Appl. No.: 15/455,125

(22) Filed: Mar. 9, 2017

(65) Prior Publication Data

US 2017/0215624 A1 Aug. 3, 2017

Related U.S. Application Data

(63) Continuation-in-part of application No. 14/991,934, filed on Jan. 9, 2016.

(51) Int. Cl.
*A47J 27/21* (2006.01)
*B65D 1/02* (2006.01)
(Continued)

(52) U.S. Cl.
CPC .......... *A47J 27/21166* (2013.01); *A45F 3/18* (2013.01); *B65D 1/02* (2013.01); *B65D 23/0885* (2013.01);
(Continued)

(58) Field of Classification Search
CPC ........ C02F 1/18; A47J 27/21; A47J 27/21166; A45F 2200/0583; A45F 3/18; B65D 1/02;
(Continued)

(56) References Cited

U.S. PATENT DOCUMENTS 2,138,466 A * 11/1938 Alexander ............ B65D 49/06
137/38
2,460,159 A * 1/1949 White ................... B60P 3/2255
137/351
(Continued)

FOREIGN PATENT DOCUMENTS

BR PI0804210 * 7/2010 ............. B65D 39/00
CN 201353106 Y * 12/2009 ............. A47J 41/02
(Continued)

OTHER PUBLICATIONS

TheWaterBottleStore.com. (2012). New Wave Enviro Stainless Steel 600ml 20oz. TheWaterBottleStore.com. Accessed Oct. 13, 2018 at https://www.thewaterbottlestore.com/20oz-600ml-stainless-steel-bottle-new-wave-enviro-p/nw39.htm (Year: 2012).*
(Continued)

*Primary Examiner* — Youngsul Jeong
*Assistant Examiner* — Gabriel E Gitman
(74) *Attorney, Agent, or Firm* — R. William Grahm (57) ABSTRACT

A heatable canteen includes a hand held vessel having a bottom and upward extending wall which terminates into a top having an open top receiving surface, a removable cap connected to said top receiving surface, the removable cap having an outer portion which removably sealably connects to the top receiving surface and has an interior channel extending therethrough and has a valve seat in a lower end thereof and a valve ball installed in a manner to bias the valve ball against the valve seat to a normally closed position. A secondary vessel is provided about the hand held vessel. A lid is connected to the vessel or cap by way go a heatable line. A distillation tube removably connects to the vessel.

10 Claims, 7 Drawing Sheets

(51) Int. Cl.
  *B65D 39/00* (2006.01)
  *B65D 23/10* (2006.01)
  *B65D 23/08* (2006.01)
  *B65D 47/06* (2006.01)
  *A45F 3/18* (2006.01)
  *B65D 51/16* (2006.01)
  *F16K 17/04* (2006.01)
  *F16K 15/06* (2006.01)
  *C02F 1/18* (2006.01)

(52) U.S. Cl.
  CPC ....... *B65D 23/104* (2013.01); *B65D 39/0035* (2013.01); *B65D 47/06* (2013.01); *B65D 51/1644* (2013.01); *F16K 15/063* (2013.01); *F16K 17/0406* (2013.01); *A45F 2200/0583* (2013.01); *A47J 27/21* (2013.01); *C02F 1/18* (2013.01)

(58) Field of Classification Search
  CPC ............ B65D 39/0035; B65D 23/0885; B65D 23/104; B65D 47/06; B65D 51/1644; F16K 15/063; F16K 17/0406
  See application file for complete search history.

(56) References Cited

U.S. PATENT DOCUMENTS

| | | | | |
|---|---|---|---|---|
| 3,179,300 A | * | 4/1965 | Davidson | B65D 35/46 222/213 |
| 4,240,272 A | * | 12/1980 | Tiede | A45C 11/20 215/12.1 |
| 4,450,966 A | * | 5/1984 | Villavicencio, Jr. | C02F 1/002 138/119 |
| 5,088,948 A | * | 2/1992 | Scheurer | A47G 19/2266 215/388 |
| 6,290,090 B1 | * | 9/2001 | Essebaggers | B65D 47/248 220/705 |
| 7,091,455 B2 | * | 8/2006 | Fung | A47J 27/2105 219/429 |
| 2010/0044375 A1 | * | 2/2010 | Rockstad | B65D 1/323 220/203.29 |
| 2010/0308047 A1 | * | 12/2010 | Regan | A45F 3/18 220/212.5 |

FOREIGN PATENT DOCUMENTS

| | | | | |
|---|---|---|---|---|
| CN | 201939160 U | * | 8/2011 | ............. A47J 41/00 |
| CN | 102210619 A | * | 10/2011 | ............. A61F 7/08 |
| DE | 202015102788 U1 | * | 7/2015 | ............. A47J 27/21 |

OTHER PUBLICATIONS

BRPI0804210A2_ENG (Patentscope machine translation of Lima) (Year: 2010).*
CN102210619A_ENG (Espacenet machine translation of Jiao) (Year: 2011).*
CN201353106Y_ENG (Espacenet machine translation of Cao) (Year: 2009).*
CN201939160U_ENG (WIPO machine translation of Xie) (Year: 2011).*
DE202015102788U1_ENG (Espacenet machine translation of Tung) (Year: 2015).*

* cited by examiner

HEATABLE CANTEEN

This is a continuation-in-part of U.S. patent application Ser. No. 14/991,934 file Jan. 9, 2016 and claims the benefit thereof.

BACKGROUND OF INVENTION

Field of Invention

The instant invention relates to heatable containers. More particularly, the invention relates to a heatable canteen.

Prior Art

The prior art has numerous devices for heating vessels. For example, tea kettles have been used to heat liquid therein and commonly includes a hinged lid which covers a port on the top of the kettle. When the fluid, such as water, reaches a sufficient temperature, the lid opens to let steam out indicating the fluid therein has reached a desired temperature.

Canteens are well known to be fashioned in a vessel of a generally hand held size with a port to which a top fixes, such as a threaded top, to maintain the fluid therein in a manner to prevent leakage during transportation or evaporation. While there are many known canteen types and configurations, there remains a need to improve canteens to have multifunction characteristics.

SUMMARY OF INVENTION

It is an object to improve heatable vessels.

It is a further object to improve canteens.

Still another object is to provide a heatable canteen.

A further object is to provide a distillation device.

Yet another object is to provide heatable canteen with a mechanism for retrieving the same from a fire.

Accordingly, an embodiment of the invention is directed to a heatable canteen. The heatable canteen preferably includes a a hand carried vessel having a bottom and upward extending wall which terminates into a top having an open top receiving surface, such as a port. A removable cap is connected to the top receiving surface. There can be provided a removable lid which removably connects to the vessel about the top, e.g., by way of press-fit, threaded or snap-fit relation. Connected preferably within the lid is a high-heat resistant line which interconnects the lid with the vessel or cap. The line can be of a suitable length such as 6 to 10 feet.

The cap includes an outer portion which removably sealably connects to the top receiving surface and has an interior channel extending therethrough and has a valve seat formed on a lower end thereof. A valve stem with a valve head seal is operably disposed in the interior channel and a spring is operably disposed about the valve stem in a manner to bias the valve head and seal against the valve seat to a normally closed position. In this way when the cap is disposed onto the vessel, the fluids are normally contained therein regardless of orientation of the canteen. The spring is of a spring constant such that upon the canteen being heated, for example over a fire, upon sufficient heat being applied the pressure builds to cause the spring to compress relieving the pressure and alerting the user that the fluids are sufficiently heated.

Optionally, another embodiment contemplates a weight valve stop which seals by virtue of its configuration and mass and gravity when oriented above the valve seat. In this embodiment, when the pressure in the vessel is sufficiently high it will overcome the weight of the valve stop removing it from the valve seat.

Another aspect of the invention is to provide a distillation tube removably connectable to the cap and in communication with the interior channel thereof. The distillation tube can have a telescoping portion extending laterally from the cap. The distillation tube can be in a collapsed condition for storage with a portion of one end within the cap of the canteen with the other telescoping portion projecting laterally outwardly from the cap of the canteen thus the two forming an L-shape.

In addition, there is provided a pair or arms, preferably removable and pivotal, connected to the canteen providing a handle which may be grasped by the user to place the canteen over a fire. The arms can be connected to a secondary vessel which removably friction fits about the hand held vessel and can be used to hold the same over a fire or can be removed and used as a cooking vessel.

Further objects will be apparent from reading the disclosure and drawings hereto.

DETAILED DESCRIPTION OF PREFERRED EMBODIMENT

Referring now to the drawings, a heatable canteen of the instant invention is generally designated with the numeral 10. The heatable canteen 10 preferably includes a hand held vessel 12 which here is seen as generally cylindrical, however, other geometric configurations are contemplated. The canteen 12 and its components can preferably comprise high-temperature resistance metal. Exemplary metals can preferably include high-temperature resistance metal such as stainless steel is a metal alloy, made up of steel mixed with elements such as chromium, nickel, molybdenum, silicon, aluminum, and carbon having a melting point of above 1700 degree Celsius. Refractory metals suitable for alloys with the invention can include molybdenum, for example, titanium-zirconium-molybdenum alloy with extra-ordinary strength and creeps resistance in high temperatures. Tungsten may also be part of an alloy to improve its high-temperature resistivity. Others include niobium alloys with tungsten to make different high heat resistant or rhenium and its alloys. It is recognized other materials can be be employed with less desirable melting points, which might be useful as well.

The hand held vessel 12 has a bottom 14 and upward extending wall 16 which terminates into a top 18 by way of a neck 20. The top 18 has an open top receiving surface 22, such as a port, which communicates with an inner surface 24 of neck 20.

Figure 1:
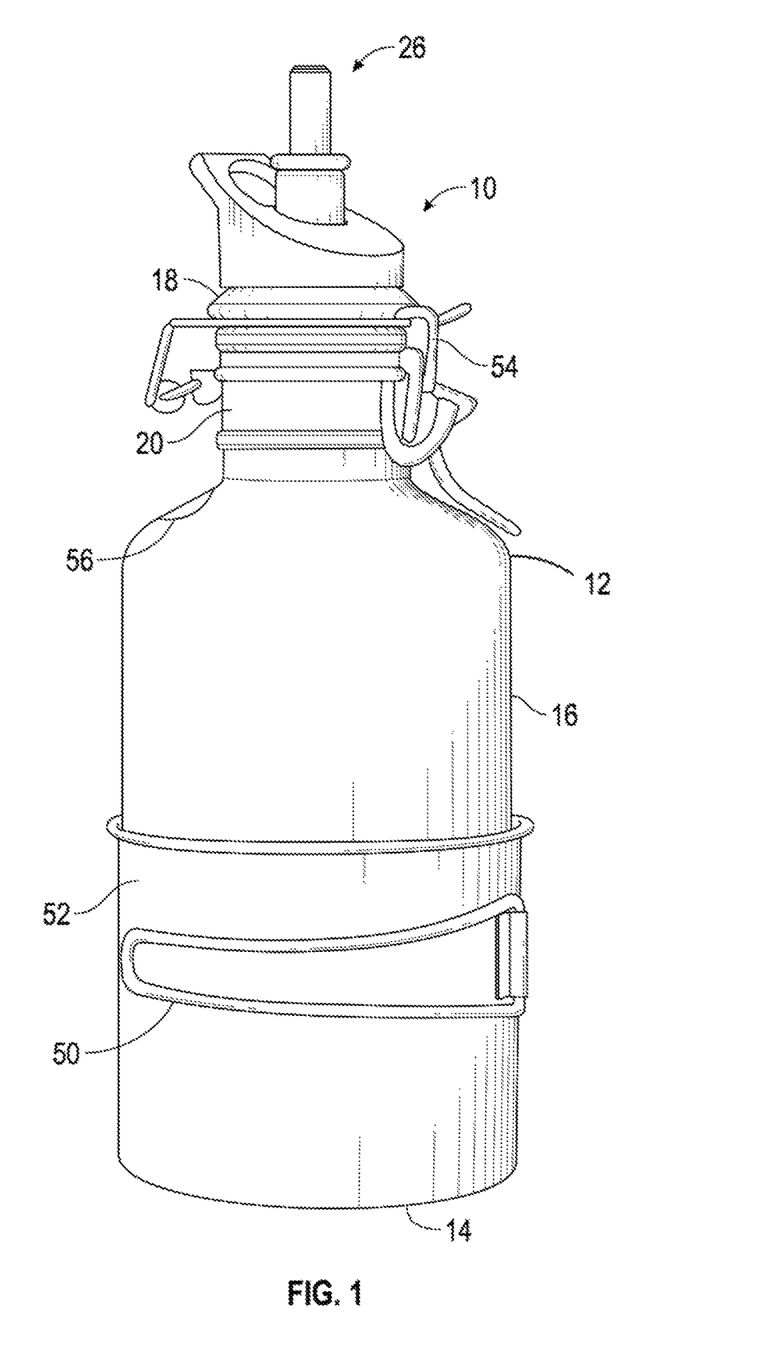
FIG. 1 is a perspective view of an embodiment of the invention.
Figure 2:
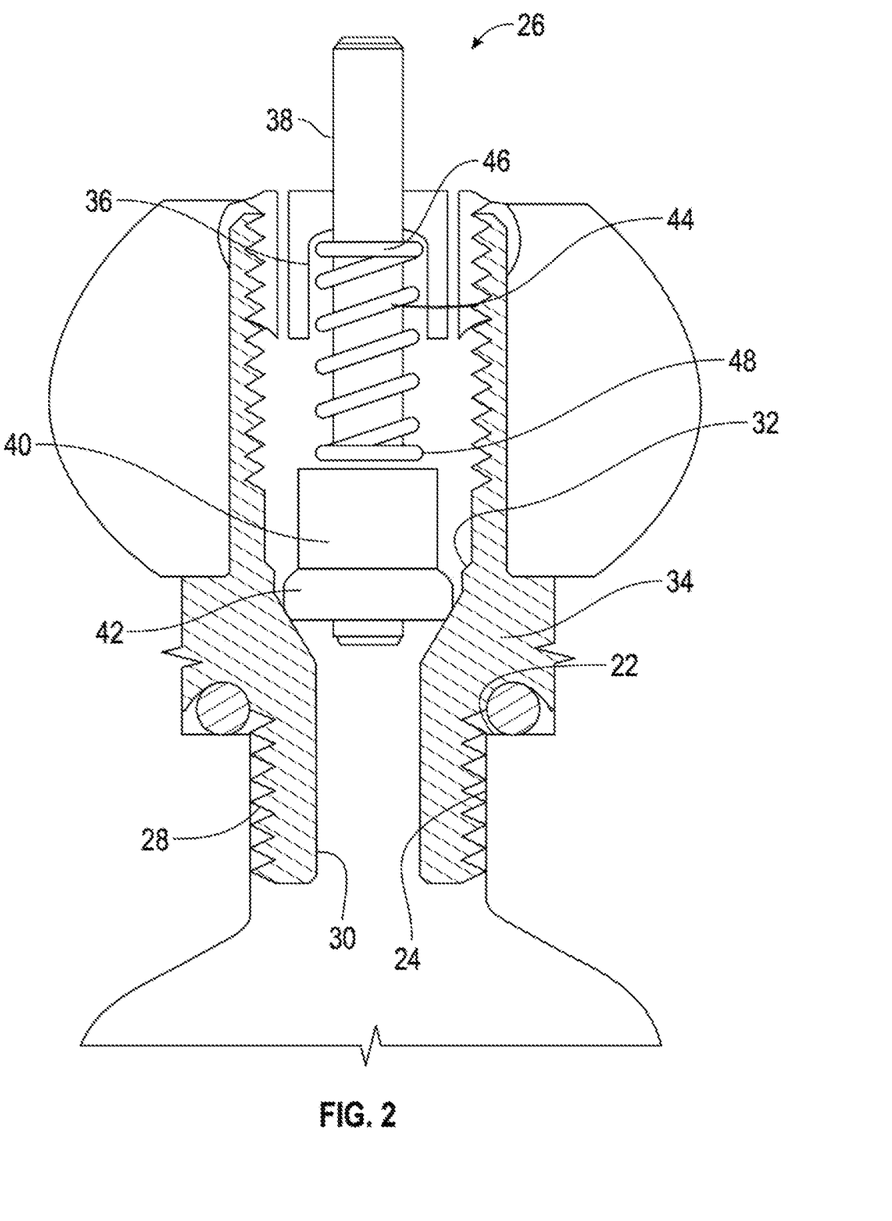
FIG. 2 is a partial sectional view of a cap of the invention.

A removable cap 26 is connected to the top receiving surface 22. The cap 26 includes an outer portion 28 which removably sealably connects to the top receiving surface 22 and has an interior channel 30 extending therethrough and has a valve seat 32 formed on a lower end 34 thereof. An upper ledge 36 is formed in the interior channel 30. One type of valve assembly includes a valve stem 38 having a valve head seal 40 that is operably disposed in the interior channel 30. The valve head seal 40 can include a gasket 42. A spring 44 is operably disposed about the valve stem 38 on one end 46 against upper ledge 36 and another end 48 against valve head seal 40 in a manner such that it biases the valve head seal 40 and gasket 42 against the valve seat 32 to a normally closed position. In this way when the cap 26 is disposed onto the hand held vessel 12, the fluids are normally contained therein regardless of orientation of the canteen 10. This permits the user to carry the canteen 10 in a backpack or like or on a belt without risk of leakage. The spring 44 is of a spring constant such that upon the canteen 10 being heated, for example over a fire, upon sufficient heat being applied the pressure builds to cause the spring 44 to compress relieving the pressure and alerting the user that the fluids are sufficiently heated.

There can be provided a removable lid 60 which removably connects to the vessel 12, e.g., by way of press-fit, threaded or snap-fit relation. It is envisioned that there can be an attachment 61 which can connect about an end of the vessel 12. Optionally, it is also envisioned that the lid 60 can directly connect about an end of the vessel 12. Connected preferably within the lid 60 is a high-heat resistant line 62 which interconnects the lid 60 with the vessel 12 or cap 26. The high-heat resistant line 62 can be of a suitable length such as 6 to 10 feet. The line can be made of high temperature resistant material such as TETRAGLAS 3000™ from Goodyear which is a high temperature fabric for service temperatures to 2300° F. with short excursions to 3000° F.

Figure 5:
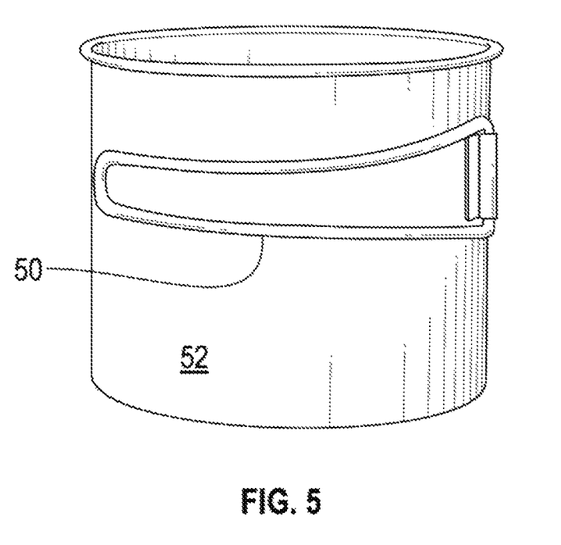
FIG. 5 is a secondary vessel with arms closed.
Figure 6:
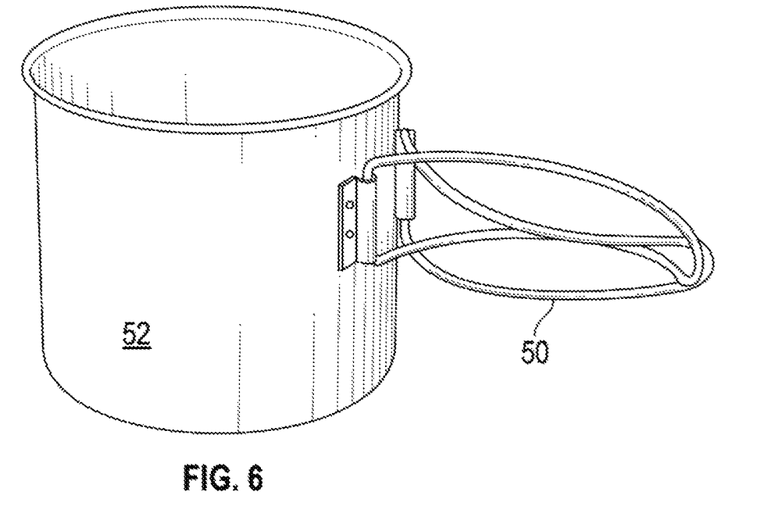
FIG. 6 is a secondary vessel with arms open.

In addition, there is provided a pair or arms 50, preferably removable and pivotal, and as envisioned can be connected to the canteen 10 directly or indirectly providing a handle which may be grasped by the user to place the canteen 10 over a fire. In the case of indirect connection, the arms 50 can be connected to a secondary vessel 52 which removably friction fits about the hand held vessel 12 and can be used to hold the same in a boiling hot environment such as over a fire or can be removed and used as a separate cooking vessel.

Figure 3:
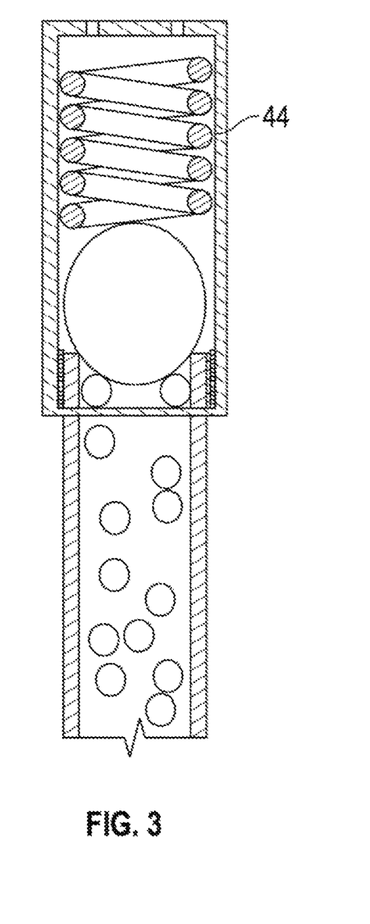
FIG. 3 is a functional representation of the cap in a closed position.
Figure 4:
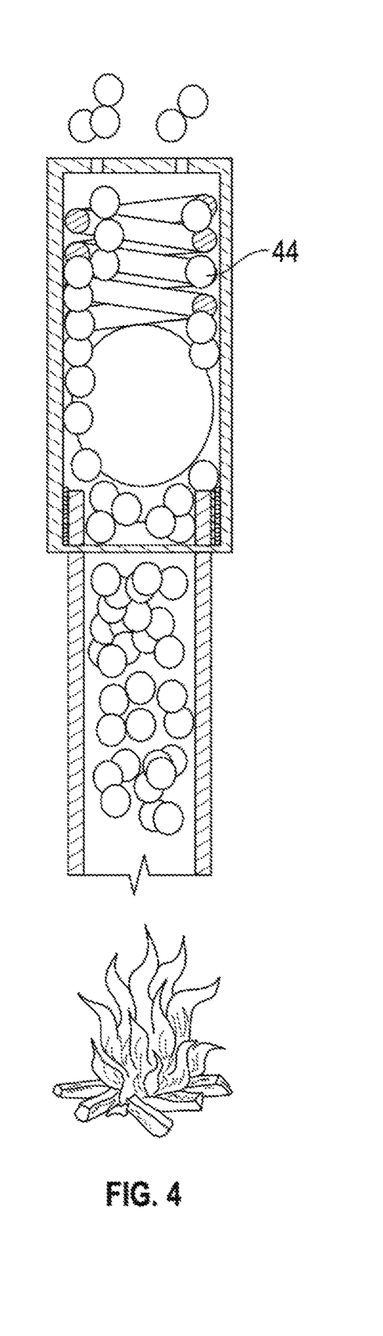
FIG. 4 is a function representation of the cap in an open position.

FIG. 3 depicts a closed position. FIG. 4 depicts an open position when the canteen 10 is under heat. The cap 26 can be hingedly connected to the neck 20 by way of a hinge lock mechanism 54 of the type known in the art.

Additionally, a safety relief valve 56 can also be incorporated into the hand held vessel 12. In this way, if the other valve assembly fails to open under dangerous temperature and pressure, the safety valve 56 will open if a predetermined temperature/pressure condition exists which is predetermined a dangerous level.

Figure 7:
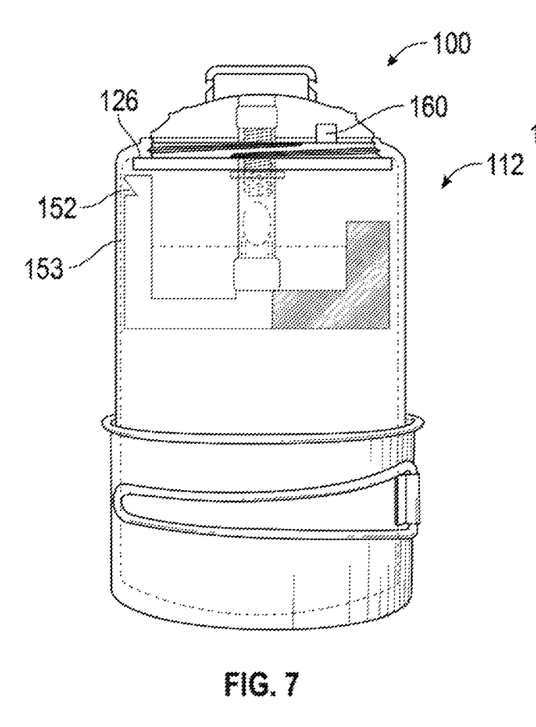
FIG. 7 is sectional schematic of another embodiment of the invention.
Figure 8:
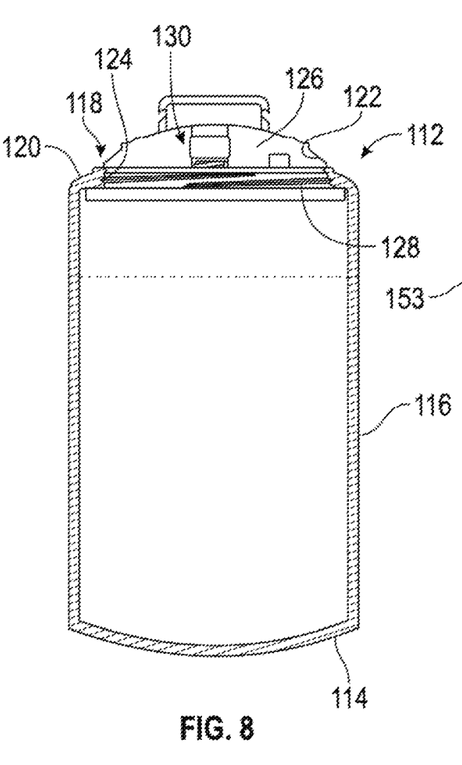
FIG. 8 is a sectional schematic of FIG. 7 with a pressure receive valve removed.
Figure 9:
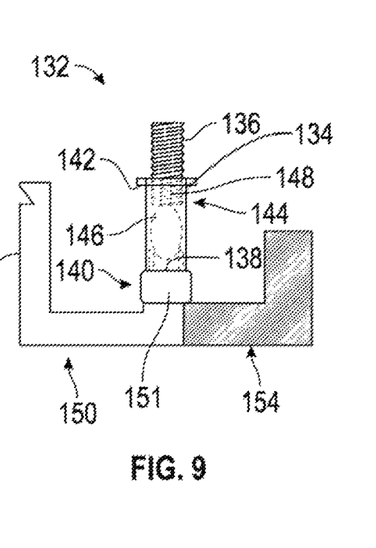
FIG. 9 depicts a pressure relief valve seen in FIG. 7.
Figure 10:
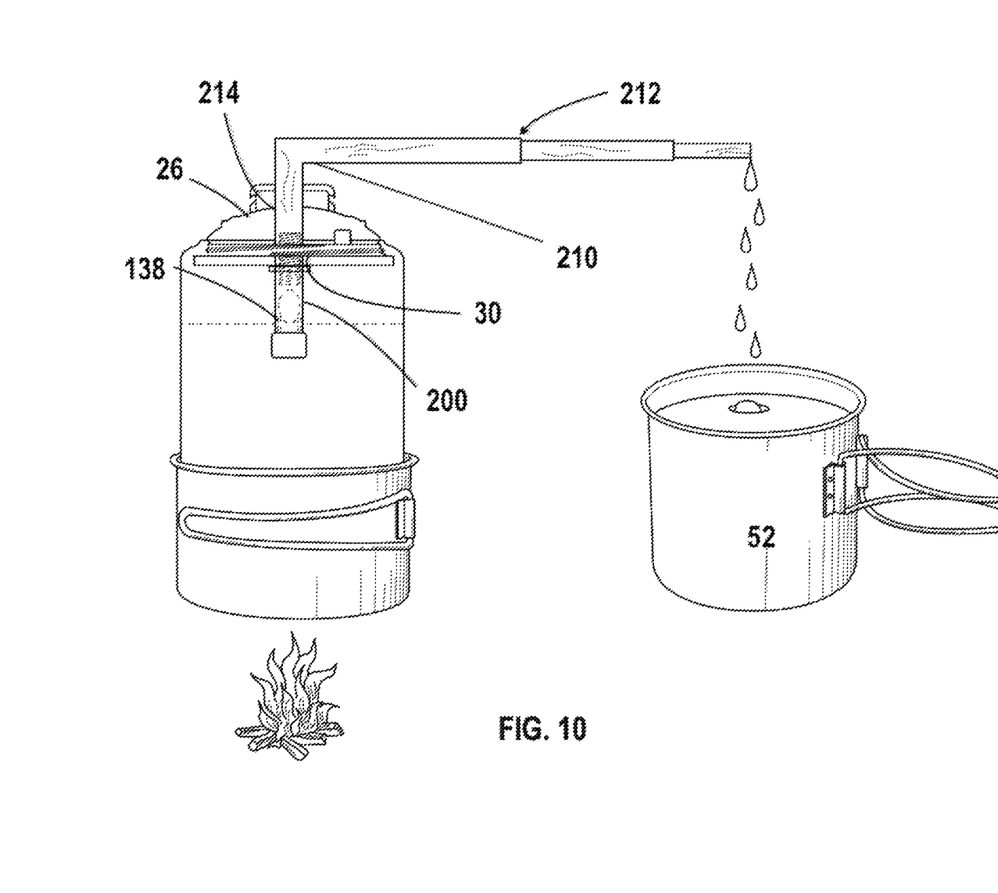
FIG. 10 depicts another embodiment of the invention.
Figure 11:
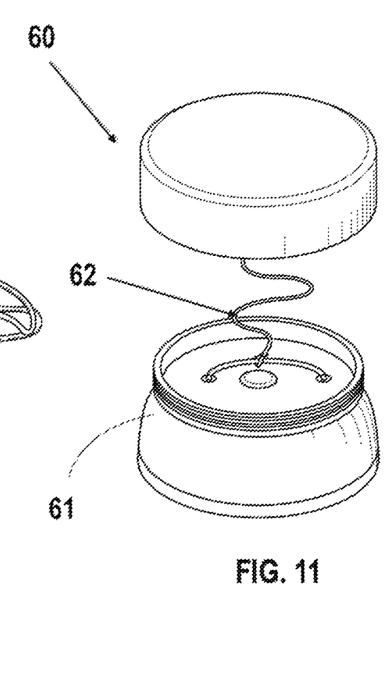
FIG. 11 depicts still another aspect of the invention.

As seen in FIGS. 7, 8 and 9, an alternative embodiment of the invention is provided. Here, a canteen 100 includes a hand held vessel 112 which here is seen as generally cylindrical, however, other geometric configurations are contemplated. The hand held vessel 112 has a bottom 114 and upward extending wall 116 which terminates into a top 118 by way of a neck 120. The top 118 has an open top receiving surface 122, such as a port, which communicates with an inner surface 124 of neck 120.

A removable cap 126 is connected to the top surface 122. The cap 126 includes an outer portion 128 which removably sealably connects to the top receiving surface 122, such as a threaded surface, and has an interior channel 130 extending therethrough which can also be threaded. In this embodiment, there is provided a J shaped pressure relief valve 132 having a stem 134 having a threaded end 136 for threadbare connecting to threaded channel 130. Inside the stem 134 can be a valve seat 138 formed in a lower end 140 thereof. An upper ledge 142 is formed in a midsection 144 thereof. A valve assembly lies within the stem 134 includes a valve head seal 146 operably disposed therein. A spring 148 or other biasing mechanism can be operably disposed against upper ledge 142 and another end against valve head seal 146 in a manner to provide a normally closed position. In this way, the fluids are normally contained therein regardless of orientation of the canteen 100. This permits the user to carry the canteen 100 in a backpack or like or on a belt without risk of leakage.

Another embodiment contemplates a weight valve stop 200 which seals by virtue of its configuration and mass and gravity when oriented above the valve seat 138. In this embodiment, when the pressure in the vessel 12 is sufficiently high it will overcome the weight of the valve stop 200 removing it from the valve seat 138.

Another portion of J shaped pressure relief valve 132 is angled conduit 150 which has one end 151 rotatably connected to the lower end 140 of the stem 134 and another end 153 terminating adjacent the cap 126 and has an orifice 152 which faces inside wall 116 adjacent the cap 126. In opposite relation to conduit 150 is a weight 154 fixable attached to end 151 such that when the canteen is turned on its side, the end 153 remains up in order to aid in venting to outside atmosphere through the pressure relief valve 132. The pressure relieve valve 132 works in a like manner as described above. Additionally, a safety valve 160 can be incorporated into the canteen 100. The canteen 10, 100 and its components can be made of high heat resistant material, such as stainless steel for all parts which are exposed high heat.

Figure 12:
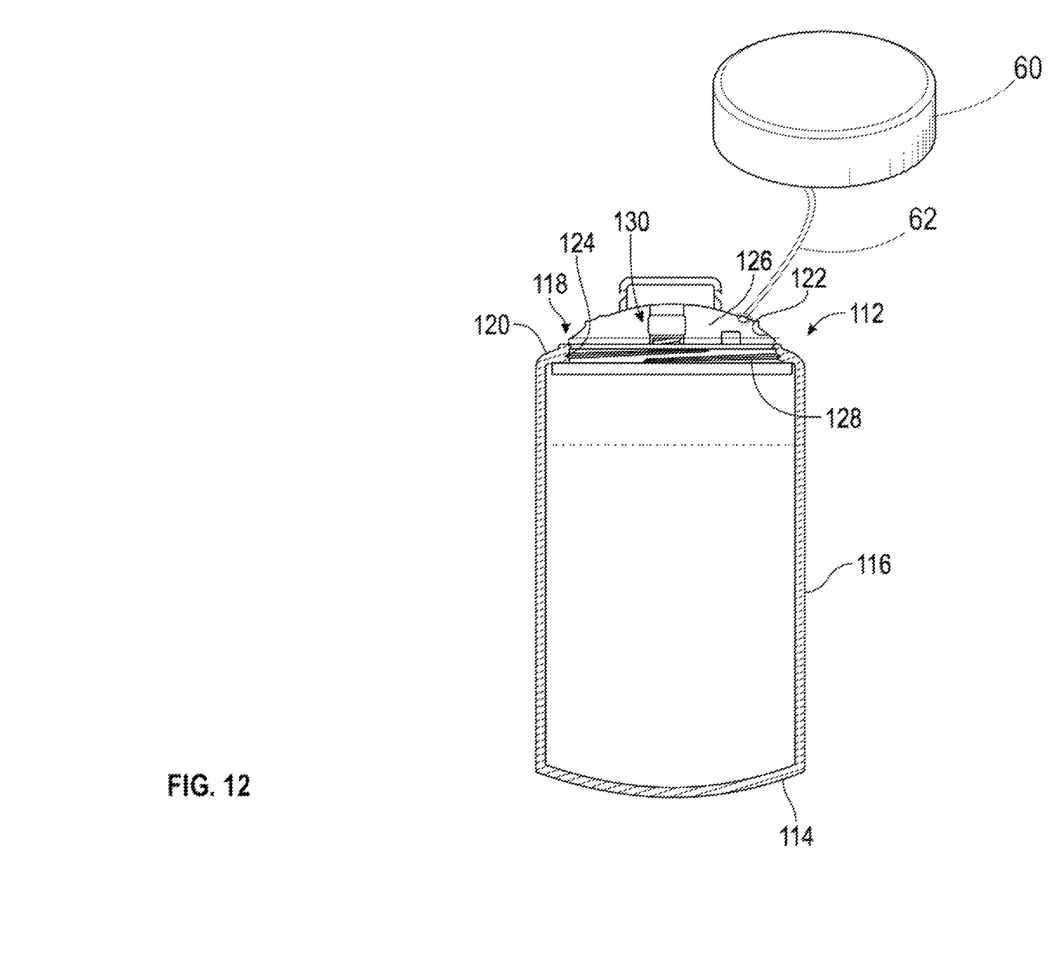
FIG. 12 depicts still another embodiment of the invention.

Another aspect of the invention is a distillation tube 210 removably connectable to the cap 26 and in communication with the interior channel 30. The distillation tube 210 can have a telescoping portion 212 extending laterally from the cap 26. The distillation tube 210 can be in a collapsed condition for storage with a portion of one end 214 within the cap 26 of the canteen with the other telescoping portion 212 projecting laterally outwardly from the cap 26 of the canteen thus the two forming an L-shape.

While the instant invention has been described in and shown above, there are various modifications, derivations and improvements which can be employed. Accordingly, these modifications, derivations and improvements are to be covered by the appended claims.

What is claimed is:

1. A heatable canteen, which includes:
   a hand held vessel having a bottom and an upwardly extending wall which terminates into a top having an open top receiving surface; and
   a removable cap connected to said top receiving surface, said removable cap having an outer portion which removably sealably connects to said top receiving surface and has an interior channel extending therethrough and has a pressure relief valve therein to provide a normally closed position and which under a predetermined amount of one of pressure and temperature moves to an open position, which further includes a J-shaped conduit having a first end sealably connected to said interior channel and a second end rotatably connected to said first end at a rotatable connection, said first end having a terminal orifice adjacent said removable cap and inside said upwardly extending wall and further including a weighted member heavier than said second end and fixably connected to said rotatable connection and extending opposite said second end.

2. The heatable canteen of claim 1, which includes:
a lid removably connected to one of said vessel and said cap by way of a heat resistant line.

3. The heatable canteen of claim 1, which further includes at least one arm connected to said canteen providing a handle which is configured to be grasped by a user to place said canteen over a fire.

4. The heatable canteen of claim 1, which includes a distillation tube communicably connected to said interior channel.

5. The heatable canteen of claim 4, wherein said distillation tube is collapsible.

6. The heatable canteen of claim 1, wherein said pressure relief valve includes a biasing mechanism that includes a valve head seat with a valve ball operably disposed adjacent thereto and a spring that is operably disposed in a manner to bias said valve ball against said valve head seat to said normally closed position.

7. The heatable canteen of claim 6, wherein said spring has a spring constant such that, in response to a pressure increase within said canteen, said spring compresses to relieve pressure through an opening formed between said valve ball head seal and said valve head seat.

8. The heatable canteen of claim 1, wherein said pressure relief valve includes a gravity seal mechanism.

9. The heatable canteen of claim 1, which includes a secondary vessel which removably friction fits about said hand held vessel and having an arm connected thereto to hold said secondary vessel over a fire.

10. The heatable canteen of claim 1, which further includes a safety valve mechanism formed in said canteen which opens upon a predetermined temperature/pressure condition being reached.

\* \* \* \* \*